Dec. 30, 1969     F. SÖFFGE     3,486,180

PREFABRICATED FOLDING BRIDGE TRANSPORTING AND LAYING VEHICLE

Filed March 15, 1968     2 Sheets-Sheet 1

Inventor:
FRIEDHELM SÖFFGE

By Craig & Antonelli
ATTORNEYS

Dec. 30, 1969  F. SÖFFGE  3,486,180
PREFABRICATED FOLDING BRIDGE TRANSPORTING AND LAYING VEHICLE
Filed March 15, 1968  2 Sheets-Sheet 2

Inventor:
FRIEDHELM SÖFFGE

BY Craig P Antonelli
ATTORNEYS

United States Patent Office 3,486,180
Patented Dec. 30, 1969

3,486,180
PREFABRICATED FOLDING BRIDGE TRANSPORTING AND LAYING VEHICLE
Friedhelm Söffge, Kornwestheim, Wurttemberg, Germany, assignor to Dr.-Ing. h.c.F. Porsche KG, Stuttgart-Zuffenhausen, Germany
Filed Mar. 15, 1968, Ser. No. 713,433
Claims priority, application Germany, Mar. 31, 1967, P 41,767
Int. Cl. E01d *15/12*
U.S. Cl. 14—1         10 Claims

ABSTRACT OF THE DISCLOSURE

A prefabricated folding bridge with a central bridge portion and folding access ramps is carried by powered rollers supported within tracks on a cantilever support that is pivotally mounted on a powered vehicle. Hydraulic cyclinder connected to the hydraulic system of the power vehicle pivot the ramps from their folded position into their extended position through the interposition of a guide arm pivoted at one end to the respective ramp and having its other end received within a longitudinal guide slot and pivotally attached to the power cylinder. The bridge is of a two lane type with a central space having the tracks, rollers and power means therein.

BACKGROUND OF THE INVENTION

Bridges transported and installed by vehicles are known. Such bridges usually consist of two pivotally connected halves transported in the folded position and unfolded for locking together only during laying of the bridge. However, such a construction has the considerable disadvantage that the components to be moved by the power mechanism of the vehicle are particularly large and heavy, because each is one half of the bridge. The resulting high actuation forces require particularly expensive and powerful components for the support and movement of the bridge portions, with a resulting increase in the manufacturing costs and weight of the vehicle. Furthermore, the center of gravity of the vehicle is shifted disadvantageously with unfolding of the heavy bridge halves so that additional support means are necessary to be arranged at the bridge or at the laying mechanism.

Also, it is known to have a bridge provided with foldable access ramps to be mounted on detachable wheels and pulled behind a vehicle. In order to install such a vehicle, it is necessary to first lay girders, beams or supports over which the bridge is moved and then lowered. In this construction, the access ramps joined to the central section of the bridge do not assume any supporting function, whereby the span width of the bridge is restricted to the relatively small length of the central section.

BRIEF SUMMARY OF THE INVENTION

Accordingly, it is an object of the present invention to provide a prefabricated folding bridge of a simple construction requiring only small operating forces for folding and installing the bridge, which has a large span width.

This is accomplished with the present invention by the use of a guide arm pivotally connected at one end to an access ramp, which is pivotally connected to the central portion of the bridge. The other end of the guide arm is provided with supporting rollers received within a guide track providing for its translation in the longitudinal direction of the bridge. Due to the three-component construction of the bridge, only relatively small operating forces are required for installing the bridge, which forces are further diminished by the advantageous arrangement of the guide arms serving for unfolding and folding the access ramps. The small power requirement and the relatively easily movable bridge components also render superfluous any additional supporting elements for holding up the bridge. The guide track that guides the other end of the guide arm, for each access ramp, is arranged above the guide rails provided for mounting the bridge in the vehicle and on both sides of the central space between the two lanes of the bridge. By mounting the guide tracks and rollers, with their operating mechanisms in the central space between the lanes, damage and soiling of the guide tracks is greatly diminished.

A further advantage results from the translational movement of the control mechanism or hydraulic cylinder that operates the guide arm. This hydraulic cylinder is within the central space or section of the bridge and in fluid communication with the hydraulic system of the vehicle. Thus, the hydraulic cylinder may be controlled for unfolding the bridge from the interior of the vehicle, which is of considerable advantage particularly when employing the bridge for military purposes. In order to extend the unfolded bridge as far as possible from the vehicle during installation, the access ramps are provided with terminal portions of the guide rails or tracks supporting the bridge, which terminal portions are aligned with and complementary extensions of the guide rails or tracks of the central bridge portion.

BRIEF DESCRIPTION OF THE DRAWING

Further objects, features and advantages of the present invention will become more clear from the following detailed description of the drawing, wherein.

DETAILED DESCRIPTION OF THE DRAWING

Figure 1:
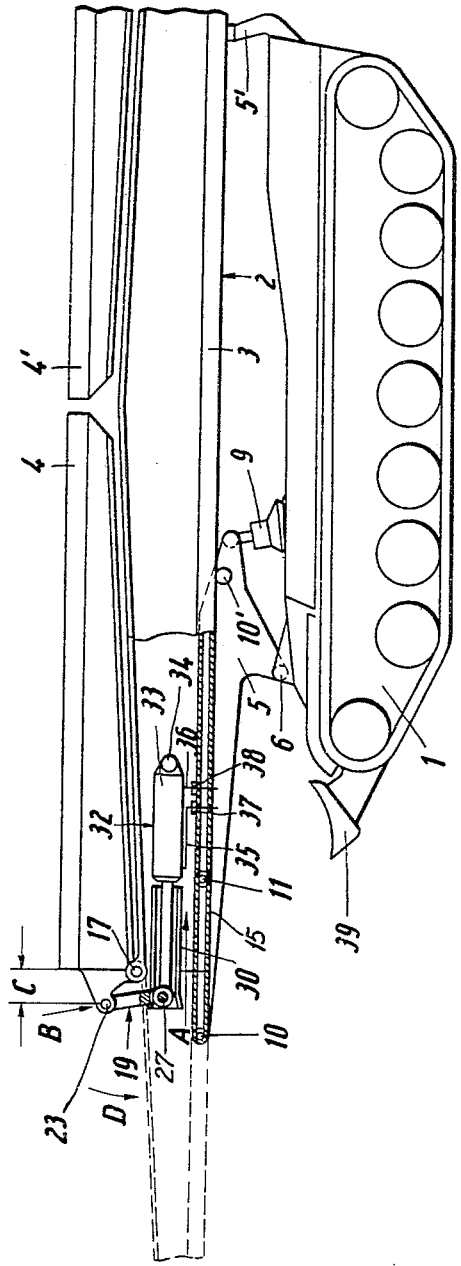
FIGURE 1 is a partial side elevation view of a "Caterpillar" or track vehicle with a bridge in the transporting position, in partial schematic representation and also in partial section along the line 1—1 of FIGURE 2.
Figure 2:
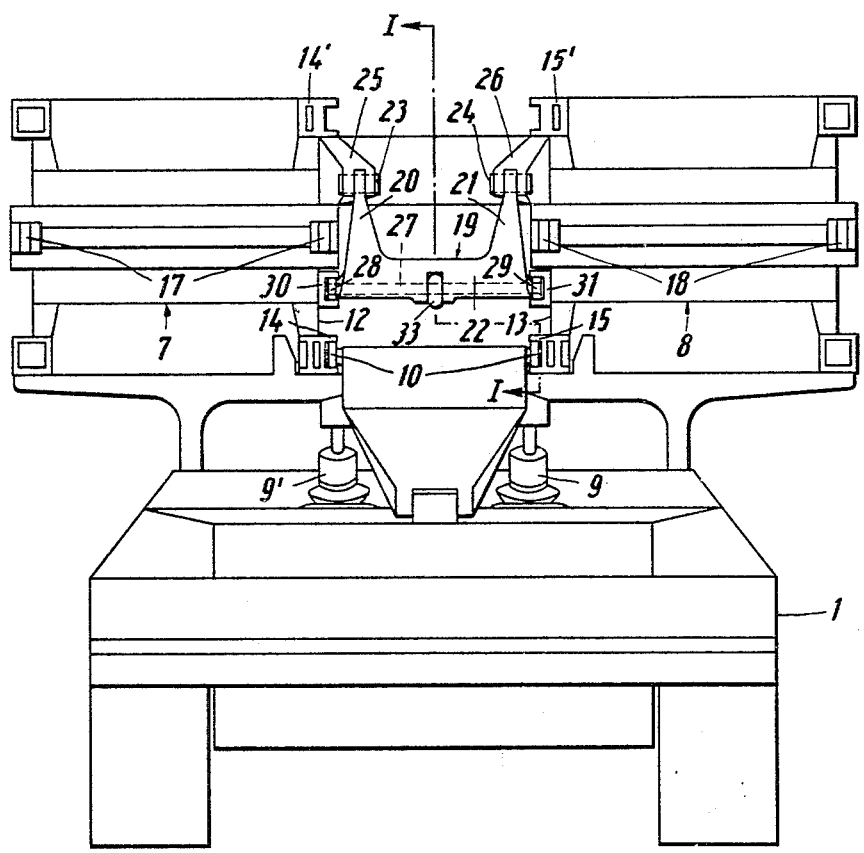
FIGURE 2 is a front elevation view of the vehicle according to FIGURE 1, on an enlarged scale.

A two track lane bridge 2 is mounted on a track laying or endless track vehicle 1. The bridge 2 has a central bridge portion 3 and two access ramps 4 and 4', respectively, hingedly connected at opposite ends of the central portion 3. In the illustrated transporting position, the bridge 2 is supported on a cantilever support 5 and a bracket 5'. The cantilever support 5 is pivotally mounted on the vehicle 1 for rotation about a bearing axis of rotation 6 extending generally transverse to the longitudinal direction of the bridge. The bridge forms two track lanes 7 and 8, which are rigidly interconnected with each other and forming a central space therebetween having the cantilever support. Two hydraulic working cylinders 9, 9' are mounted between the vehicle body and the cantilever support 5 for pivoting the cantilever support 5 about its axis 6. The cantilever support 5 has guide rollers 10, supporting rollers 10' freely engaging the bottom of the central bridge portion 3 and powered supporting rollers 11 operatively received in U-shaped guide tracks or channels 14, 15 opposed to each other and mounted on the longitudinal inner sides 12, 13 of the track lanes 7 and 8 for moving the bridge as a whole longitudinally relative to the vehicle body 1.

The access ramps 4 and 4' and their corresponding mountings are substantially mirror images of each other with corresponding operations so that the construction and operation of only one will be described and shown in detail. The access ramp 4 is provided with terminal guide track portions 14', 15', which in the unfolded position of the bridge will be aligned with correspondingly shaped guide tracks 14, 15 to form extensions thereof.

A pair of hinges 17 and 18 connect the access ramp 4 with the central portion 3 of the bridge.

In order to flip the access ramp 4 about the hinges 17, 18 from its illustrated transporting position to an unfolded position (not shown) a guide arm 19 is provided, which guide arm 19 comprises two arms 20, 21 integrally connected with each other by a crosspiece 22. The arms 20, 21 are pivotally mounted by means of bearing blocks 25, 26 and bearing pins 23, 25 to the respective track lanes of the access ramp 4. On the end of the guide arm 19 opposite from the bearing blocks 25, 26, there are provided guide rollers 28, 29 that are rotatably supported at opposite ends of the crosspiece 22 by a shaft 27 extending through the crosspiece 22. The guide rollers 28, 29 are received within straight guide tracks 30, 31, which are mounted above the guide tracks 14, 15, respectively, at the central portion 3 of the bridge 2. A control device 32 is provided for moving the guide arm 19. Preferably, the control device 32 comprises a hydraulic operating cylinder 33 pivotally connected at one end to the crosspiece 22 of the guide arm 19 by means of a shaft 27 and pivotally connected at its opposite end with a central portion 3 of the bridge 2 by means of a bearing member 34. The operating cylinder 33 extends in the plane of the straight guide tracks 30, 31. Hydraulic supply pressure and exhaust lines 35 and 36 for the double acting hydraulic cylinder 33 are operatively connected with the hydraulic system (not shown) of the vehicle 1 by means of detachable coupling elements 37, 38 provided on the cantilever support 5.

The access ramp 4 is unfolded by supplying hydraulic pressure to the conduit 35 for retraction so that the guide arm 19 pivotally connected to the operating cylinder 33 is moved in the direction of arrow A under the guidance of the guide rollers 28, 29 received in the straight guide tracks 30, 31. This will result in tractive forces effective in the direction of arrow B exerted upon the access ramp 4 by the arms 20 and 21 of the guide arm 19. This force will pivot the access ramp 4 because of the moment produced by the lever arm formed by the spacing C of the pivotal connections 23, 24 and 17, 18, which pivoting of the access ramp 4 will be in the direction D into its in-use or unfolded position illustrated in dashed lines in FIGURE 1. After the opposite access ramp 4' has been unfolded in the same manner, the bridge 2 is longitudinally advanced relative to the vehicle 1 by driving the supporting rollers 11 along their respective tracks in the cantilever support 5 in a manner similar to the device as disclosed in applicant's U.S. application No. 713,899; thereafter, the extended bridge is lowered over the obstacle with the aid of the operating cylinders 9, 9'.

The powered vehicle 1 is provided with a scraping blade 39 adjustably mounted on its front end for grading the bridge foundation.

The movement of the bridge 2 from its extended position to its folded or transport position is accomplished in a manner analogous to the above described unfolding operation, with the steps in reverse succession. The bridge 2 is lifted by the cantilever support 5 and then retracted by driving the supporting rollers 11 until the bridge rests on the bracket 5' in the position shown in dotted lines on FIGURE 1. Thereafter, the operating cylinder 33 is provided with hydraulic pressure by way of conduit 36 so that the access ramp 4 or, analogously, access ramp 4' is folded back into the transporting position shown in full lines of FIGURE 1 through the operation of the guide arm 19 and the hinges 17, 18.

It is contemplated that various other types of vehicles may be employed for transporting the bridge and setting it in place. Also, manual or electric controls may be provided instead of the hydraulic operating components.

Although a single preferred embodiment of the present invention has been specifically described for purposes of illustration, further modifications, embodiments and variations are contemplated within the spirit and scope of the present invention as defined by the following claims.

I claim:

1. A prefabricated folding bridge transporting and laying vehicle, comprising: a prefabricated folding bridge having a central bridge portion and two access ramps pivotally mounted on opposite ends of the central bridge portion for movement between an extended aligned position and a folded storage, transport position; a powered vehicle body; a cantilever support pivotally mounted on said vehicle body; said cantilever support and said bridge having cooperating support track and support roller means supporting said bridge on said cantilever support for movement in the longitudinal direction of said bridge; said bridge including a guide arm at each of its opposite ends arranged between the corresponding access ramp and the central portion and pivotally connected at one end to the corresponding access ramp at a substantial distance from the pivotal connection between the corresponding access ramp and the central portion, guide track means operatively supported by the central portion and guide roller means adapted to be received in said guide track means for supporting the opposite end of said guide arm for movement in the longitudinal direction of said bridge.

2. The device according to claim 1, wherein said bridge, in its extended position, has two parallel lane portions with a central intermediate space; said supporting guide tracks being on respective ones of said lane portions facing each other on the inside sides thereof; said guide arm guide tracks being spaced above said supporting guide tracks.

3. The device of claim 1, including power means mounted on central bridge portion for moving said guide arm opposite ends in the longitudinal direction within the respective guide arm guide tracks 4. The device of claim 3, wherein said power means for each of said access ramps is a hydraulically operated piston-cylinder having one end pivotally connected to the corresponding guide arm opposite end and its other end pivotally connected to the inside portion of said central bridge portion; said vehicle having a hydraulic system in fluid communication with said piston-cylinder.

5. The device according to claim 4, wherein said guide arm piston-cylinder has releasable fluid connections with the hydraulic system of said vehicle.

6. The device according to claim 1, wherein said access ramps are provided with supporting guide tracks in their central portion aligned with and forming extensions of the correspondingly shaped support tracks in the central section in the extended position of the bridge.

7. The device according to claim 1, wherein said cantilever support has means for driving said support roller means about their axes for engaging said support tracks and moving said bridge longitudinally way from said vehicle.

8. The device according to claim 1, wherein said vehicle has piston-cylinder hydraulic means for pivoting said cantilever support about an axis extending generally perpendicular to the longitudinal direction of the bridge.

9. The device according to claim 1, wherein said vehicle has a pivotally mounted blade means on one end for clearing the land for purposes of installing the bridge.

10. The device according to claim 1, wherein said vehicle has spaced ground engaging power tracks.

References Cited

UNITED STATES PATENTS 3,010,128   11/1961   Gillois et al. _____ 14—1

FOREIGN PATENTS 180,327   8/1962   Sweden.

JACOB L. NACKENOFF, Primary Examiner